United States Patent
Ch et al.

(10) Patent No.: US 9,534,679 B2
(45) Date of Patent: Jan. 3, 2017

(54) VEHICLE DIFFERENTIAL ASSEMBLY

(71) Applicant: GM Global Technology Operations LLC, Detroit, MI (US)

(72) Inventors: Bhaskara Ch, Rajamundry (IN); Vishal Khare, Pune (IN); Venkateswar Katha, Bangalore (IN)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/730,943

(22) Filed: Jun. 4, 2015

(65) Prior Publication Data
US 2016/0356371 A1  Dec. 8, 2016

(51) Int. Cl.
| | |
|---|---|
| *F16H 48/08* | (2006.01) |
| *F16H 48/38* | (2012.01) |
| *G01P 3/02* | (2006.01) |
| F16H 48/40 | (2012.01) |
| G01B 7/14 | (2006.01) |

(52) U.S. Cl.
CPC ............ *F16H 48/38* (2013.01); *F16H 48/08* (2013.01); *G01P 3/02* (2013.01); *F16H 48/40* (2013.01); *F16H 2048/387* (2013.01); *G01B 7/146* (2013.01)

(58) Field of Classification Search
CPC .... F16H 48/38; F16H 48/08; F16H 2048/387; F16H 4/40; G01B 7/146

USPC ........ 475/230; 74/606 R; 324/207.2, 207.22, 324/207.25

See application file for complete search history.

(56) References Cited

U.S. PATENT DOCUMENTS

| | | | | |
|---|---|---|---|---|
| 1,987,716 | A * | 1/1935 | Skelton | F16H 48/08 475/230 |
| 3,964,346 | A * | 6/1976 | Myers, Sr. | F16H 48/08 475/234 |
| 4,363,248 | A * | 12/1982 | Brisabois | F16H 48/08 475/230 |
| 4,683,775 | A * | 8/1987 | Hilker | F16H 48/08 475/150 |
| 4,722,244 | A * | 2/1988 | Tsuchiya | F16H 48/08 475/221 |
| 4,724,935 | A * | 2/1988 | Roper | B60T 8/171 180/244 |
| 6,976,929 | B1 * | 12/2005 | Bonanti | F16H 48/08 475/230 |

FOREIGN PATENT DOCUMENTS

JP  EP 1734288 A2 * 12/2006 ............. F16H 48/08

* cited by examiner

*Primary Examiner* — Roger Pang

(57) ABSTRACT

A differential assembly for a powertrain of a vehicle includes a differential housing, a differential shaft, and a retainer ring. The differential shaft retains a pair of opposing bevel gears within the differential housing in mesh with a pair of opposing side gears each connected to a half shaft. The retainer ring is disposed on the outside of the differential housing covering the bores in which is fit the differential shaft.

18 Claims, 2 Drawing Sheets

VEHICLE DIFFERENTIAL ASSEMBLY

TECHNICAL FIELD

The present disclosure relates to vehicle powertrains and more particularly to a differential assembly for torque transfer from a vehicle transmission to the half shafts.

BACKGROUND

The statements in this section merely provide background information related to the present disclosure and may or may not constitute prior art.

Automotive powertrains generally employ a transmission and a differential mechanism. The differential mechanism is included to permit distribution of power from the transmission to the drive wheels of a vehicle or to the fore and aft drive differentials of a vehicle. The differential mechanism has an input gear member which rotates a housing or casing, a plurality of side gears, one of which is connected to drive a right axle and another of which is connected to drive a left axle.

The differential components for the most part rotate in unison with the rotation of the input gear. However, during some maneuvers, one axle may rotate more rapidly than the other. For example, if the vehicle is cornering, the outside wheel and axle and therefore the side gear of the differential rotate at a higher speed than the radially inner side gear of the differential. Also, when one axle is on a very slippery surface, such as snow or ice, that tire or wheel may rotate faster than the opposite tire or wheel that is on dry or good traction pavement. While the rotational difference during vehicle cornering is acceptable the rotation of one axle relative to the other resulting from slippage is not a desirable feature.

In prior differential designs there have been many mechanisms employed to assemble and improve the functionality of a differential. However, many of these attempts still require high assembly cost while adding little if any functionality. Accordingly, there is a constant need to improve the assembly, costs, and functionality of an automobile differential.

SUMMARY

The present invention provides a differential assembly for a powertrain of a vehicle, the differential including a differential housing, a first and second half shaft, a differential shaft, and a retainer ring. The differential housing has circumferential flange, a first and a second half shaft bores, a first and second differential shaft bore, and a cylindrical portion. The first and second half shafts each have a first end. The first half shaft has a side gear fixed for common rotation to the first end of the first half shaft. The second half shaft has a side gear fixed for common rotation to the first end of the second half shaft. The first end of the first half shaft is disposed in the differential housing with the first half shaft extending through the first half shaft bore. The first end of the second half shaft is disposed in the differential housing with the second half shaft extending through the second half shaft bore.

The differential shaft has a first end and a second end opposite the first end. The differential shaft is a rotational support for a first and a second bevel gear. The differential shaft is disposed in the differential housing with the first end of the differential shaft disposed in the first differential shaft bore and the second end of the differential shaft disposed in the second differential shaft bore, and each of the bevel gears mesh with each of the side gears.

The retainer ring is disposed on the cylindrical portion of the differential housing at least partially covers the differential shaft bores thus retaining the differential shaft within the differential housing.

In one example of the present invention, the retainer ring includes a retainer portion and a castellated speed portion. The retainer portion of the retainer ring at least partially covers the differential shaft bores.

In another example of the present invention, the differential assembly includes a speed sensor disposed in a housing of the powertrain. The speed sensor is positioned to detect the rotation of the speed portion of the retainer speed ring and therefore the speed of the differential assembly.

In yet another example of the present invention, the retainer portion of the retainer speed ring has a first diameter, the speed portion of the retainer speed ring has a second diameter, and the first diameter is less than the second diameter.

In yet another example of the present invention, the retainer ring is interference fit onto the cylindrical portion of the differential housing.

In yet another example of the present invention, the cylindrical portion of the differential housing is adjacent the circumferential flange.

In yet another example of the present invention, the differential housing further includes an annular portion. The circumferential flange is disposed adjacent to the annular portion.

In yet another example of the present invention, the differential assembly includes a ring gear affixed to the circumferential flange of the differential housing, and wherein the ring gear is configured to mesh with an output gear of a transmission of the powertrain.

The above features and advantages and other features and advantages of the present invention are readily apparent from the following detailed description of the best modes for carrying out the invention when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
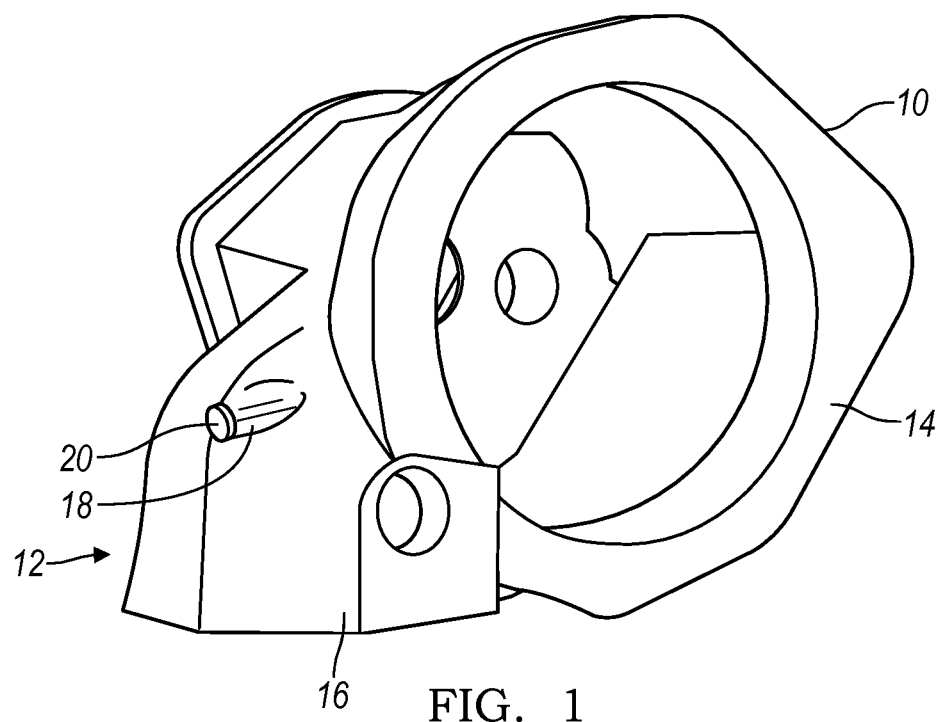
FIG. 1 is a perspective view of a powertrain housing in accordance with the present invention.
Figure 2:
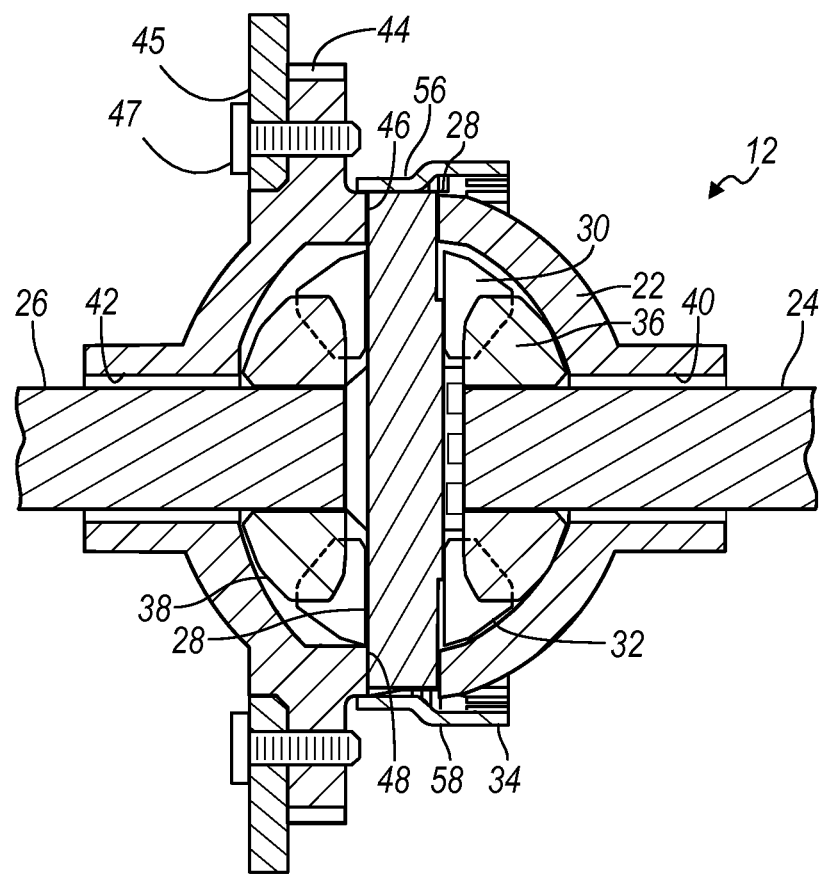
FIG. 2 is a cross-sectional view of a differential in accordance with the present invention.

Referring to FIGS. 1 and 2, a powertrain housing 10 including a differential assembly 12 are illustrated and will now be described. The powertrain housing 10 includes a transmission portion 14, a differential portion 16, and a speed sensor port 18. The differential assembly 12 is disposed in the differential portion 16 of the powertrain housing 10. The speed sensor port 18 is extends from the differential portion 16 of the powertrain housing 10. A speed sensor 20 is disposed in the speed sensor port 18 in an arrangement that will be discussed further below.

The differential assembly 12, shown in more detail in FIG. 2, includes a differential housing 22, a first and a second half shaft 24, 26, a differential shaft 28, a first and a second bevel gear 30, 32, a retainer speed ring 34, and a first and a second side gear 36, 38. More specifically, the differential housing 22 includes a first and a second half shaft bores 40, 42, a flange 44, and a first and a second differential shaft bores 46, 48. The first half shaft bore 40 is axially aligned with and disposed opposite the second half shaft bore 42. Likewise, the first differential shaft bore 46 is axially aligned with and disposed opposite the second differential shaft bore 48. The ring gear 45 is fastened to a circumferential flange 44 of the differential housing 22 using a plurality of bolts 47 and is axially aligned with the half shaft bores 40, 42 and further disposed on the outer periphery of the differential housing 22. However, the ring gear 45 may be fixed to the differential housing 22 or formed in the differential housing 22 using other methods without departing from the scope of the invention.

The first side gear 36 is connected for common rotation to and end of the first half shaft 24. The first half shaft 24 is disposed such that the first side gear 36 is disposed on the interior of the differential housing 22 and remainder of the first half shaft 24 passes through and is rotatably supported by the first half shaft bore 40. The second side gear 38 is connected for common rotation to and end of the second half shaft 26. The second half shaft 26 is disposed such that the second side gear 38 is disposed on the interior of the differential housing 22 and remainder of the second half shaft 26 passes through and is rotatably supported by the second half shaft bore 42.

The differential shaft 28 has a first end 50 and a second end 52 opposite the first end. The first end 50 of the differential shaft 28 is disposed in the first differential shaft bore 46 of the differential housing 22. The second end 52 of the differential shaft 28 is disposed in the second differential shaft bore 48 of the differential housing 22. The differential shaft 28 passes between the ends of the half shafts 24, 26 and is perpendicular to the half shafts 24, 26. The first and second bevel gears 30, 32 are rotatably supported by the differential shaft 28 and arranged with the side gears 36, 38 such that the first and second bevel gears 30, 32 mesh with each of the first and second side gears 36, 328.

While being disposed in the differential shaft bores 46, 48 of the differential housing 22, the ends 50, 52 of the differential shaft are flat. The retainer speed ring 34 is a circular member having a retainer portion 56 and a toothed speed portion 58. The retainer portion 56 has a smaller diameter than the speed portion 58 and is disposed around the differential housing 22 at least partially covering each end 50, 52 of the differential shaft 28. The retainer speed ring 34 is fixed in this position around the differential housing 22, maintains the position of the differential shaft 28 in the differential housing 22, and rotates in common with the differential housing.

Figure 3A:
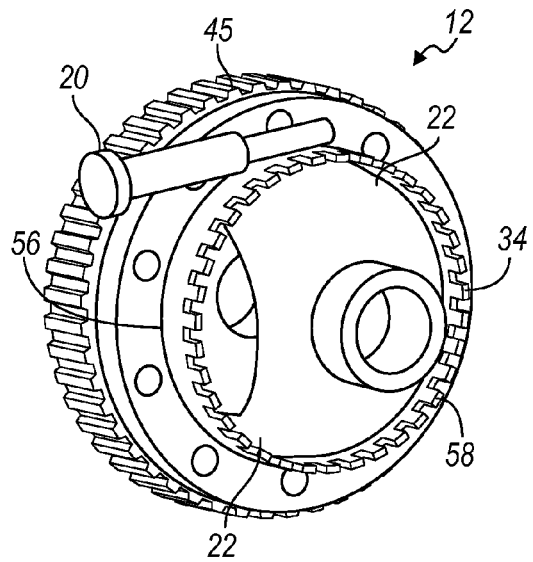
FIG. 3A is a perspective view of a differential in accordance with the present invention.
Figure 3B:
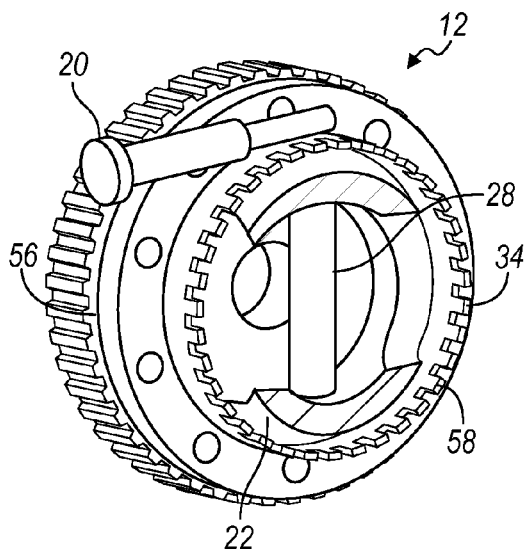
FIG. 3B is a partial perspective sectional view of a differential in accordance with the present invention.

Referring now to FIGS. 3A and 3B, the differential assembly 12 is illustrated in relation to the speed sensor 20 without the powertrain housing 10. The speed sensor 20 is disposed in the powertrain housing 10 so that the end of the speed sensor 20 is aligned with the speed portion 58 of the retainer speed ring 34. In this regard, the retainer speed ring 34 serves the dual purpose of retaining the differential shaft 28 in the differential housing 22 and providing a speed ring 34 from which the speed sensor 20 can sense the speed of the differential assembly 12.

Figure 4:
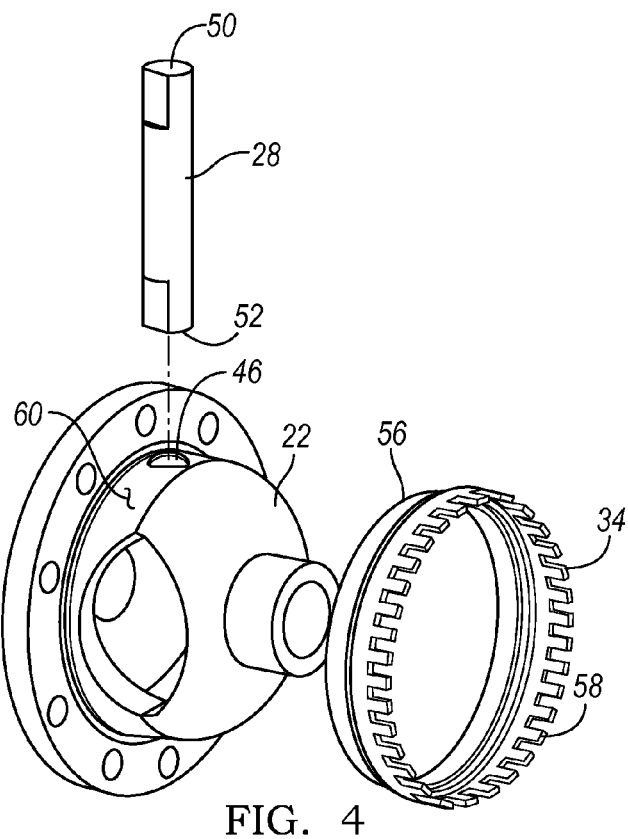
FIG. 4 is an exploded view of a differential in accordance with the present invention.

Referring now to FIG. 4, an exploded view of a portion of the differential assembly 12 is shown and will now be described. The differential assembly 12 as shown includes the differential housing 22, the differential shaft 28 and the retainer speed ring 34. The process of assembling the differential assembly 12 includes inserting the differential shaft 28 into the first and a second differential shaft bores 46, 48 of the differential housing 22 followed by fitting the retainer speed ring 34 around a cylindrical portion 60 of the differential housing 22. The retainer speed ring 34 at least partially covers the differential shaft bores 46, 48 essentially trapping the differential shaft 28 in the differential housing 22. The retainer speed ring 34 is held in place on the differential housing 22 by an interference fit, however, alternative means of retaining the retainer speed ring 34 to the differential housing 22 are employable without departing from the scope of the invention. For example, the retainer speed ring 34 may be fastened to the differential housing 22 using a threaded interior surface of the retainer speed ring 34 and a threaded exterior surface of the cylindrical portion 60 of the differential housing 22. Also, the retainer speed ring 34 may be fastened to the differential housing 22 using bolts, rivets, or other fasteners.

The description of the invention is merely exemplary in nature and variations that do not depart from the spirit of the invention are intended to be within the scope of the invention. Such variations are not to be regarded as a departure from the spirit and scope of the invention.

The following is claimed:

1. A differential assembly for a powertrain of a vehicle, the differential including:
   a differential housing having circumferential flange, a first and a second half shaft bores, a first and second differential shaft bores, and a cylindrical portion;
   a first and second half shaft each having a first end, and wherein the first half shaft has a side gear fixed for common rotation to the first end of the first half shaft, the second half shaft has a side gear fixed for common rotation to the first end of the second half shaft, the first end of the first half shaft is disposed in the differential housing with the first half shaft extending through the first half shaft bore, and the first end of the second half shaft is disposed in the differential housing with the second half shaft extending through the second half shaft bore;
   a differential shaft having a first end and a second end opposite the first end, and wherein the differential shaft is a rotational support for a first and a second bevel gears, the differential shaft is disposed in the differential housing with the first end of the differential shaft disposed in the first differential shaft bore and the second end of the differential shaft disposed in the second differential shaft bore, and each of the bevel gears mesh with each of the side gears; and
   a retainer ring disposed on the cylindrical portion of the differential housing at least partially covering the differential shaft bores thus retaining the differential shaft within the differential housing; and
   wherein the retainer ring includes a retainer portion and a castellated speed portion, and wherein the retainer portion of the retainer ring at least partially covers the differential shaft bores.

2. The differential assembly of claim 1 further including a speed sensor disposed in a housing of the powertrain, and wherein the speed sensor is positioned to detect the rotation of the speed portion of the retainer speed ring and therefore the speed of the differential assembly.

3. The differential assembly of claim 2 wherein the retainer portion of the retainer speed ring has a first diameter, the speed portion of the retainer speed ring has a second diameter, and the first diameter is less than the second diameter.

4. The differential assembly of claim 1 wherein the retainer ring is interference fit onto the cylindrical portion of the differential housing.

5. The differential assembly of claim 1 wherein the cylindrical portion of the differential housing is adjacent the circumferential flange.

6. The differential assembly of claim 1 wherein the differential housing further includes an annular portion and wherein the circumferential flange is disposed adjacent to the annular portion.

7. The differential assembly of claim 1 further including a ring gear affixed to the circumferential flange of the differential housing, and wherein the ring gear is configured to mesh with an output gear of a transmission of the powertrain.

8. A differential assembly for a powertrain of a vehicle, the differential including:
    a differential housing having circumferential flange, a first and a second half shaft bores, a first and second differential shaft bores, and a cylindrical portion;
    a first and second half shafts each having a first end, and wherein the first half shaft has a side gear fixed for common rotation to the first end of the first half shaft, the second half shaft has a side gear fixed for common rotation to the first end of the second half shaft, the first end of the first half shaft is disposed in the differential housing with the first half shaft extending through the first half shaft bore, and the first end of the second half shaft is disposed in the differential housing with the second half shaft extending through the second half shaft bore;
    a differential shaft having a first end and a second end opposite the first end, and wherein the differential shaft is a rotational support for a first and a second bevel gears, the differential shaft is disposed in the differential housing with the first end of the differential shaft disposed in the first differential shaft bore and the second end of the differential shaft disposed in the second differential shaft bore, and each of the bevel gears mesh with each of the side gears; and
    a retainer ring including a retainer portion and a castellated speed portion, and wherein the retainer ring is disposed on the cylindrical portion of the differential housing such that the retainer portion at least partially covers the differential shaft bores thus retaining the differential shaft within the differential housing; and
    wherein the retainer portion of the retainer speed ring has a first diameter, the speed portion of the retainer speed ring has a second diameter, and the first diameter is less than the second diameter.

9. The differential assembly of claim 8 further including a speed sensor disposed in a housing of the powertrain, and wherein the speed sensor is positioned to detect the rotation of the speed portion of the retainer speed ring and therefore the speed of the differential assembly.

10. The differential assembly of claim 8 wherein the retainer ring is interference fit onto the cylindrical portion of the differential housing.

11. The differential assembly of claim 8 wherein the cylindrical portion of the differential housing is adjacent the circumferential flange.

12. The differential assembly of claim 8 wherein the differential housing further includes an annular portion and wherein the circumferential flange is disposed adjacent to the annular portion.

13. The differential assembly of claim 8 further including a ring gear affixed to the circumferential flange of the differential housing, and wherein the ring gear is configured to mesh with an output gear of a transmission of the powertrain.

14. A differential assembly for a powertrain of a vehicle, the differential including:
    a differential housing having circumferential flange, a first and a second half shaft bores, a first and second differential shaft bores, and a cylindrical portion;
    a first and second half shafts each having a first end, and wherein the first half shaft has a side gear fixed for common rotation to the first end of the first half shaft, the second half shaft has a side gear fixed for common rotation to the first end of the second half shaft, the first end of the first half shaft is disposed in the differential housing with the first half shaft extending through the first half shaft bore, and the first end of the second half shaft is disposed in the differential housing with the second half shaft extending through the second half shaft bore;
    a differential shaft having a first end and a second end opposite the first end, and wherein the differential shaft is a rotational support for a first and a second bevel gears, the differential shaft is disposed in the differential housing with the first end of the differential shaft disposed in the first differential shaft bore and the second end of the differential shaft disposed in the second differential shaft bore, and each of the bevel gears mesh with each of the side gears;
    a retainer ring including a retainer portion and a castellated speed portion, and wherein the retainer ring is interference fit onto the cylindrical portion of the differential housing such that the retainer portion at least partially covers the differential shaft bores thus retaining the differential shaft within the differential housing; and
    a speed sensor disposed in a housing of the powertrain, and wherein the speed sensor is aligned to detect the rotation of the speed portion of the retainer speed ring and therefore the speed of the differential assembly.

15. The differential assembly of claim 14 wherein the retainer portion of the retainer speed ring has a first diameter, the speed portion of the retainer speed ring has a second diameter, and the first diameter is less than the second diameter.

16. The differential assembly of claim 15 wherein the cylindrical portion of the differential housing is adjacent the circumferential flange.

17. The differential assembly of claim 16 wherein the differential housing further includes an annular portion and wherein the circumferential flange is disposed adjacent to the annular portion.

18. The differential assembly of claim 17 further including a ring gear affixed to the circumferential flange of the differential housing, and wherein the ring gear is configured to mesh with an output gear of a transmission of the powertrain.

* * * * *